United States Patent

[11] 3,612,816

| | | | |
|---|---|---|---|
| [72] | Inventor | Masaaki Hano | |
| | | Yokohama, Japan | |
| [21] | Appl. No. | 61,741 | |
| [22] | Filed | Aug. 6, 1970 | |
| [45] | Patented | Oct. 12, 1971 | |
| [73] | Assignee | Nippon Kokan Kabushiki Kaisha | |
| | | Tokyo, Japan | |
| [32] | Priority | Aug. 7, 1969 | |
| [33] | | Japan | |
| [31] | | 44/62040 | |

[54] TACK WELDING OF SECTIONS
9 Claims, 3 Drawing Figs.

[52] U.S. Cl......................................... 219/124,
219/87, 219/125 R, 219/127, 219/137
[51] Int. Cl........................................ B23k 9/12
[50] Field of Search............................ 219/124,
125 R, 126, 87, 91, 102, 127, 137

[56] References Cited
UNITED STATES PATENTS

| 1,580,020 | 4/1926 | Cutler et al.................. | 219/125 |
| 3,026,405 | 3/1962 | Anderson..................... | 219/124 |
| 3,061,714 | 10/1962 | Van Sciver et al............ | 219/127 |
| 3,167,636 | 1/1965 | Bosteels..................... | 219/125 |
| 3,291,360 | 12/1966 | Linnander................... | 219/124 |

Primary Examiner—J. V. Truhe
Assistant Examiner—L. A. Schutzman
Attorney—Steinberg & Blake ABSTRACT: A method and apparatus for tack-welding sections in the form of plates where at least two plates are arranged with the edge of one plate engaging a face of the other to define therewith a pair of corners situated on opposite sides of the edge of the one plate. The plates are continuously fed in the direction of the latter edge while a pair of welding units are reciprocated along paths parallel to this edge. During the time that each welding unit moves in the same direction as the plates it is rendered operable to deposit a tack weld. The structure which reciprocates the pair of welding units maintains them at all times moving in opposed directions so that while one welding unit moves in the same direction as the plates from a given starting location to a given end location the other welding unit is returning from its end location back to its starting location. The speed with which each welding means is moved at least in the same direction as the plates is different from the speed of movement of the plates.

PATENTED OCT 12 1971 3,612,816

INVENTOR
MASAAKI HANO
BY
Steinberg and Blake
ATTORNEYS

TACK WELDING OF SECTIONS

BACKGROUND OF THE INVENTION

The present invention relates to welding.

In particular, the present invention relates to tack welding of sections in the form of plates which intersect each other in any of a number of different arrangements so as to form a framework of the plates which are to be tack welded. For example, the invention is applicable to plates which intersect each other so as to form in cross section a framework having an X, H, T, or other angular configuration. There are already available various types of apparatus which are capable of operating automatically to achieve a mass production during fillet welding of plates forming frameworks of the above type. When performing operations of this type it is necessary to situate the fillets at the corners defined on opposite sides of an edge of one plate when the latter edge engages a face of another plate. Before such fillets are automatically deposited it is essential at the present time to carry out manual tack-welding operations, and this manual tack welding creates considerable difficulties because the locations where the welding is carried out are generally positioned in such a way that laborious and small-scale minute manual operations are required. The result is that the labor costs are still undesirably high, with this situation being aggravated by labor shortages which are frequently encountered in industry.

SUMMARY OF THE INVENTION

It is accordingly a primary object of the present invention to provide for tack welding of sections which will avoid the above drawbacks.

Thus, it is an object of the invention to provide a tack-welding method capable of automatically achieving tack welding which heretofore required manual operations.

Furthermore it is an object of the present invention to provide a method which will achieve the required tack welding with a high degree of efficiency as well as in a fully automatic manner.

It is also an object of the invention to provide for the tack-welding apparatus which will achieve the required results in a fully automatic manner, providing tack welds of high quality.

According to the invention the tack-welding method and apparatus is applied to plates or sections which intersect each other to form a framework which in cross section has an X, H, T, I or other configuration. One of the plates will have an edge engaging a face of the other plate to define at the latter face a pair of corners at opposite sides of the edge of the one plate, and of course the tack welds are to be deposited in these corners. The pair of plates are fed by a suitable feeding means continuously in the direction of the edge of the one plate at a given feed speed. A pair of welding means are located adjacent the corners which are to receive the tack welds for depositing tack welds at the corners when the pair of welding means are rendered operable. The pair of welding means are both reciprocated by a pair of suitable reciprocating means, respectively, along paths which are parallel to the edge of the one plate, and only at least during part of the movement of each welding means in the same direction as the plates a means operatively connected to each welding means renders it operable to deposit a tack weld. The pair of welding means are simultaneously reciprocated at speeds different from the given feed speed of the plates in mutually opposed directions so that while one welding means moves from a given starting location to a given end location the other welding means is returning from its end location to its starting location. The starting locations and end locations for both welding means are respectively situated at the same points along the path of movement of the edge of the one plate, and the speed of movement of the pair of welding means is different from, preferably slower than, the speed of movement of the plates.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
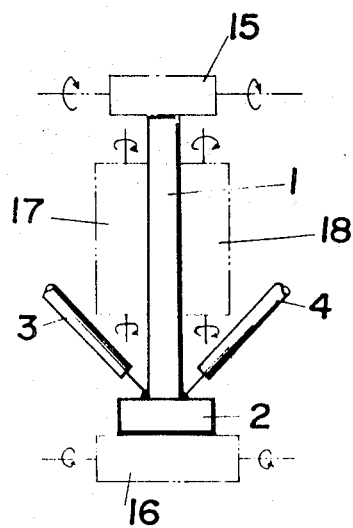
FIG. 1 is schematic illustration of a method and apparatus of the invention showing in an end view a pair of plates during the tack-welding operations.

Referring now to the drawings, FIG. 1 shows in an end view a pair of sections or plates 1 and 2 which in the illustrated example form a T-shaped framework. The plate I has a lower edge engaging the upper face of the plate 2 so as to define at this upper face a pair of corners respectively situated at opposite sides of the lower edge of the plate 1. These are the corners which will eventually receive the fillet welds. In order to deposit the tack welds in these corners a pair of welding means 3 and 4 are provided, as schematically shown in the drawings. These welding means are in the form of suitable nozzles of known construction through which, for example, suitable welding rod is fed with a suitable arc being generated to bring about the deposition of the molten tack welds when the welding means 3, 4 are rendered operable by completion of a suitable electrical circuit, as part of the operations which are carried out.

Figure 2:
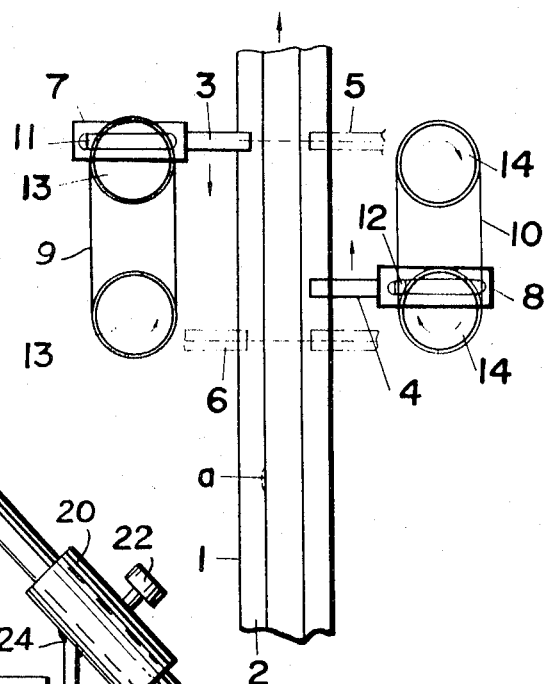
FIG. 2 is a schematic fragmentary top plan view of the method and apparatus of the invention.

A reciprocating means is operably connected with each welding means 3, 4 in order to reciprocate each welding means back and forth from a given starting location to a given end location and then on return stroke from the end location back to the starting location. The starting location for both of the welding means is indicated by the dotted line in FIG. 2, while the end location is indicated by the dotted line 5 for both of the welding means. Thus, in FIG. 2 the welding means 4 is shown in dot-dash lines fragmentarily at the starting and end locations and is shown in solid lines proceeding along from the starting toward the end location in the same direction in which the plates 1, 2 are continuously fed. On the other hand the welding means 3 is shown in FIG. 2 in solid lines just at the moment when it has started to return from its end location 5 back toward its starting location 6, where the welding means 3 is shown in dot-dash lines. A feeding means is provided for continuously feeding the plates 1, 2 in the direction of the lower edge of the plate 1 which engages the upper face of the plate 2, and the reciprocating means of the invention is connected with each welding means in order to reciprocate the latter along a path parallel to the feeding movement of the plates 1, 2. The pair of reciprocating means which are operatively connected with the pair of welding means are operated in such a way that while one welding means is moving in the same direction as the plates the other welding means is moving in the reverse or opposed direction. A means is operatively connected with each of the welding means to render the latter operable only during that time when it is moving in the same direction as the plates, but the reciprocating means acts on each welding means to move the latter at a speed different from, either slower or faster than, the speed of feed of the plates 1, 2. It is this difference between the speed of the nozzles and that of the work that is taken into account in order to determine the feeding speed of the plates as well as the reciprocating speed of the nozzles in accordance with the welding conditions which are in general encountered. The work 1, 2 is in general fed at a speed which is extremely high as compared with that encountered during conventional welding. For example, the work 1, 2 may be fed at a speed of 6,000 mm./min., in which case the pair of nozzles or welding means 3, 4 are moved at a speed of 5,000 mm./min. to 5,500 mm./min.

Thus, the pair of welding means 3, 4 are reciprocated back and forth while the work 1, 2 is fed continuously in one direction only, and when one of the welding means 3, 4 is ready to start its return stroke from the end location 5 back to the starting location 6, the operation thereof is terminated, suitable limit switches, timers, or other electrical control apparatus, being used in order to form the means which will render each welding means operable only during at least part of the time when it moves in the same direction as the work. Thus, when one of the welding means, the welding means 3, for example, is at the end location 5 ready to return to the starting location 6, the other welding means 4 will be at the starting location 6 and will commence its movement in the same direction as the work to be rendered operable during at least part of this movement toward the end location 5. When the welding means 4 reaches the end location 5, the other welding means 3 will have reached the starting point 6 and will then start to move in the same direction as the work while the welding means 4 returns to the starting location, with welding means 3 at this time being rendered operable. In this way a series of tack welds such as the tack weld *a* indicated in FIG. 2 are deposited at the corners defined between the sections or plates 1, 2. It will be noted that with this method the tack welds at one corner will be out of registry with, respectively situated between, the tack welds at the other corner so that a zigzag formation of tack welds is provided with the apparatus and method of the invention.

Figure 3:
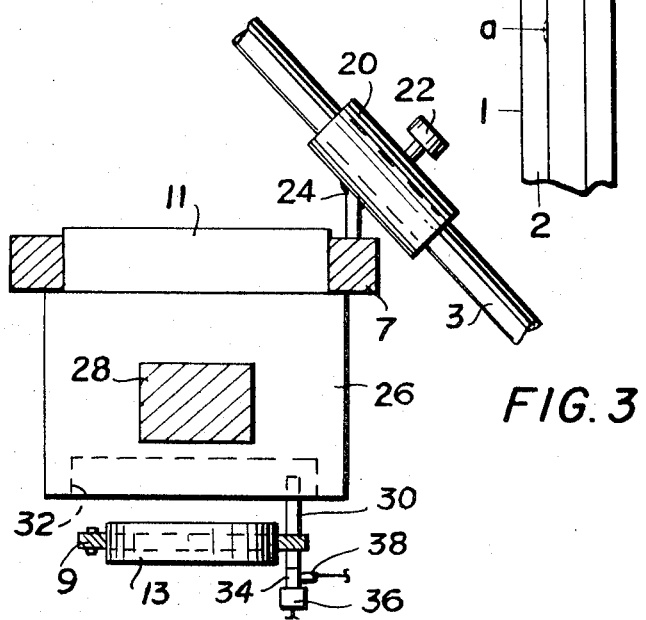
FIG. 3 is a schematic transverse sectional elevation on an enlarged scale, as compared to FIGS. 1 and 2, showing details of the method and apparatus of the invention as applied to one welding means.

The structure of the invention is shown in FIGS. 1-3 in a generally schematic manner. The pair of welding means 3, 4 are fixedly carried by suitable attachment components 7, 8, respectively. Thus, referring to FIG. 3, it will be seen that the welding means 3 is adjustably fixed in a suitable sleeve 20 as by a setscrew 22. This sleeve is fixed by any suitable support 24 onto the attachment component 7. The components 7 and 8 are respectively formed with slots which pass vertically therethrough for receiving extensions 11 and 12, respectively, of supporting blocks. Thus, FIG. 3 shows the supporting block 26 which carries the extension 11, being fixed to the latter, as by being formed integrally therewith, and of course, the extension 12, received in the slot of component 8, is supported in the same way by a suitable unillustrated block. The block 26 is formed with a central guide aperture which receives a supporting bar 28 on which the block 26 is longitudinally slidable, this bar 28 being supported in any suitable manner and extending parallel to the direction of feed of the work 1, 2. In addition to this structure operatively connected to each welding means 3, 4, each reciprocating means includes in the illustrated example a pair of sprocket wheels and a chain extending around the pair of sprocket wheels. Thus, FIG. 2 illustrates the pair of sprocket wheels 13 and the endless chain 9 of the reciprocating means for the welding means 3, as well as the pair of sprocket wheels 14 and the endless chain 10 for the reciprocating means operatively connected with the welding means 4. As may be seen from FIG. 3, the sprocket chain 9 fixedly carries an upwardly directed pin 30 received in a groove 32 formed at the underside of the block 26. This groove 32 simply extends transversely of the bar 28. Thus, as the chain 9 moves in response to rotation of the sprocket wheels 13, one of which is driven so as to provide rotation in the direction of the arrow as shown in FIG. 2, the pin 30 will engage the block 26 to bring about the reciprocation of this block together with all of the structure carried thereby. In the same way an identical structure is connected with the welding means 4 in order to reciprocate the latter.

As has been indicated above, the means for rendering each welding means operable may include any suitable limit switches, timers, or the like. FIG. 3 illustrates, for example, an electrically conductive brush component 34 carried by the chain 9 and insulated therefrom, forming, for example, an extension of the pin 30. When the brush 34 moves in the same direction as the work, it engages a pair of elongated electrical components 36 and 38 which are connected into the circuit for the welding means 3. This circuit will be completed when the brush 34 engages both of the components 36 and 38, which may be in the form of elongated electrically conductive bars of a suitable length to maintain the welding means 3 operable only for a length of time, or part of the length of time, during which it moves in the same direction as the work 1, 2. The sprocket wheels 14 are driven in the direction shown by the arrows in FIG. 2 and bring about operations identical with those provided for the welding means 3 with a structure identical with that shown in FIG. 3, for example, but suitably oriented with respect to the location of the welding means 4 on the side of the plate 1 opposite from the welding means 3. The particular reciprocating mechanism illustrated in the drawings for each welding means is but one example of different types of reciprocating means which may be provided. For example, it is possible to use fluid-pressure structures such as a piston and cylinder arrangements actuated either by hydraulic or pneumatic pressure. Also it is possible to use rotary screws which are rotated first in one direction and then in another direction to coact with suitable nuts which carry the structure in order to reciprocate the latter. Any other types of well-known reciprocating means may be used.

The feed means for feeding the work is shown in FIG. 1 as including upper and lower feed rollers 15, 16 which respectively engage the upper edge of the plate 1 and the lower face of the plate 2 in order to maintain the lower edge of the plate 1 pressed against the upper face of the plate 2. In addition, the opposed side surfaces of the plate 1 are engaged by a pair of feed rollers 17, 18, and these rollers 15–18 are driven so as to bring about a continuous feeding of the work in a direction away from the viewer of FIG. 1.

It is apparent that it a simple matter to change, in an extremely convenient way, the pitch or spacing between the successive tack welds simply by changing the relationship between the speed of feed of the work and the speed of movement of the pair of welding means. Thus, the pitch or spacing between the successive tack welds can be increased or decreased simply by changing the speed with which the pair of welding means are reciprocated or the speed of movement of the work 1, 2, as long as the movement of the parts is maintained with a range which will not undesirably retard or otherwise undesirably influence the speed with which the tack-welding operations are carried out.

Thus, with the method and apparatus of the invention the pair of welding means are simply moved at a speed different from this speed of movement of the work 1, 2 to be rendered operable while moving in the same direction as the work to provide tack welds at a required spacing from each other and in a zigzag pattern with each tack weld on one side of the plate 1 being situated between a pair of tack welds on the other side. As was pointed out above the pair of welding means are rendered operable to generate welding arcs only when the pair of welding means move in the same direction as the work. In this way it is possible to bring about a fully automatic tack-welding method and apparatus, so that tack-welding operations which heretofore have been carried out manually can now be carried out automatically. Thus, the problem of labor shortages and high labor costs can be met with the method and apparatus of the invention, while at the same time the work is carried out at a high degree of efficiency producing a beautifully finished series of tack welds arranged in a zigzag pattern with all the operations being carried out at an extremely high speed.

What is claimed is:

1. In a method of tack welding at least a pair of plates one of which has an edge engaging a face of the other plate to define at said face a pair of corners at opposite sides of the edge of said one plate, the steps of feeding said plates in the direction of said edge of said one plate at a given feed speed, simultaneously reciprocating at speeds different from said feed speed and along paths parallel to said edge of said one plate a pair of welding means for respectively depositing tack welds at said corners, and rendering each welding means operable to deposit a tack weld only during at least part of the time when each welding means moves in the same direction as said plates.